(12) United States Patent
Hoover et al.

(10) Patent No.: US 8,231,958 B2
(45) Date of Patent: Jul. 31, 2012

(54) ARTICLE AND METHOD FOR EROSION RESISTANT COMPOSITE

(75) Inventors: Kelly L. Hoover, Glastonbury, CT (US); Charles R. Watson, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 618 days.

(21) Appl. No.: 11/869,095

(22) Filed: Oct. 9, 2007

(65) Prior Publication Data

US 2009/0092842 A1    Apr. 9, 2009

(51) Int. Cl.
 *B32B 3/00* (2006.01)
 *B32B 7/02* (2006.01)
 *B32B 9/00* (2006.01)
 *B00D 3/02* (2006.01)

(52) U.S. Cl. ........ 428/157; 428/210; 428/213; 428/698; 428/699; 428/907; 428/908.8; 427/316; 427/384

(58) Field of Classification Search .................. 428/458, 428/908.8, 907, 698, 699, 210, 213, 157; 427/316, 384

See application file for complete search history.

(56) References Cited

U.S. PATENT DOCUMENTS

| | | | |
|---|---|---|---|
| 4,022,547 A | 5/1977 | Stanley | |
| 4,610,896 A | 9/1986 | Veltri | |
| 4,626,461 A | 12/1986 | Prewo | |
| 4,671,997 A | 6/1987 | Galasso | |
| 4,738,902 A | 4/1988 | Prewo | |
| 4,739,690 A * | 4/1988 | Moskowitz | 89/36.02 |
| 4,808,076 A | 2/1989 | Jarmon | |
| 5,113,582 A | 5/1992 | Monson | |
| 5,210,944 A | 5/1993 | Monson | |
| 5,296,260 A * | 3/1994 | Sawada et al. | 427/118 |
| 5,305,507 A * | 4/1994 | Dvorsky et al. | 29/25.35 |
| 5,405,571 A | 4/1995 | Truckner | |
| 5,449,273 A | 9/1995 | Hertel | |
| 5,472,315 A | 12/1995 | Alexander et al. | |
| 5,582,932 A * | 12/1996 | Oltman et al. | 429/176 |
| 5,700,743 A | 12/1997 | Puchinger | |
| 5,720,597 A | 2/1998 | Wang | |

(Continued)

FOREIGN PATENT DOCUMENTS

| | | | |
|---|---|---|---|
| EP | 1111194 | | 6/2001 |
| EP | 1288443 | | 3/2003 |
| EP | 1821011 | | 8/2007 |
| GB | 1601224 | * | 6/1973 |
| GB | 2276934 | * | 10/1994 |
| WO | 9600842 | | 1/1996 |
| WO | 01/46324 | * | 6/2001 |
| WO | 2006094935 | | 9/2006 |
| WO | 2008088600 | | 7/2008 |

OTHER PUBLICATIONS

European Search Report Dated Jan. 12, 2009.

*Primary Examiner* — Kevin R Kruer

(74) *Attorney, Agent, or Firm* — Carlson, Gaskey & Olds, P.C.

(57) ABSTRACT

A composite layer for resisting erosion includes a sacrificial layer for exposure to an erosion environment, a body layer, and an erosion resistant layer located between the sacrificial erosion layer and the body layer for protecting the body layer upon erosion of the sacrificial layer.

9 Claims, 2 Drawing Sheets

U.S. PATENT DOCUMENTS

| | | |
|---|---|---|
| 6,223,524 B1 | 5/2001 | Durcan |
| 6,609,452 B1 * | 8/2003 | McCormick et al. ........ 89/36.01 |
| 6,648,593 B2 | 11/2003 | Motherwell |
| 6,709,230 B2 | 3/2004 | Morrison |
| 6,881,036 B2 | 4/2005 | Hornick |
| 7,069,836 B1 * | 7/2006 | Palicka et al. ................ 89/36.02 |
| 7,300,893 B2 * | 11/2007 | Barsoum et al. .............. 442/134 |
| 2006/0141237 A1 * | 6/2006 | Leighton et al. ........... 428/307.7 |
| 2007/0082547 A1 * | 4/2007 | Komoto et al. ............... 439/587 |
| 2008/0271595 A1 * | 11/2008 | Bird et al. .................... 89/36.02 |

* cited by examiner

ARTICLE AND METHOD FOR EROSION RESISTANT COMPOSITE

BACKGROUND OF THE INVENTION

This disclosure relates to a composite article for resisting erosion and, more particularly, a composite article having multiple layers for resisting erosion and method for processing the composite article.

A variety of different types of aerospace components, such as gas turbine engine components, propellers, and the like, are subject to erosion from particles entrained within air streams flowing over the component. Some of these components are manufactured from relatively hard materials or include hard coatings that provide a degree of erosion protection. Although the use of hard materials and coatings may be effective for erosion resistance of many different types of components, there is a continuing need for enhanced erosion protection.

SUMMARY OF THE INVENTION

An example composite article for resisting erosion includes a sacrificial layer for exposure to an erosion environment, a body layer, and an erosion resistant layer located between the sacrificial erosion layer and the body layer for protecting the body layer upon erosion of the sacrificial layer.

An example method of processing the composite article includes forming the body layer and forming the sacrificial layer with the erosion resistant layer between the sacrificial layer and the body layer. For example, the body layer and the sacrificial layer may be formed in a molding process from an organic matrix composite, or formed from a ceramic material using a ceramic processing method.

In a further example, the composite article may be formed by laying-up at least one pre-impregnated molding layer for forming the body layer, laying-up a pre-fabricated erosion resistant layer adjacent to the pre-impregnated molding layer, laying-up a pre-impregnated molding layer for forming the sacrificial layer, and curing the pre-impregnated molding layers to form the composite article.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
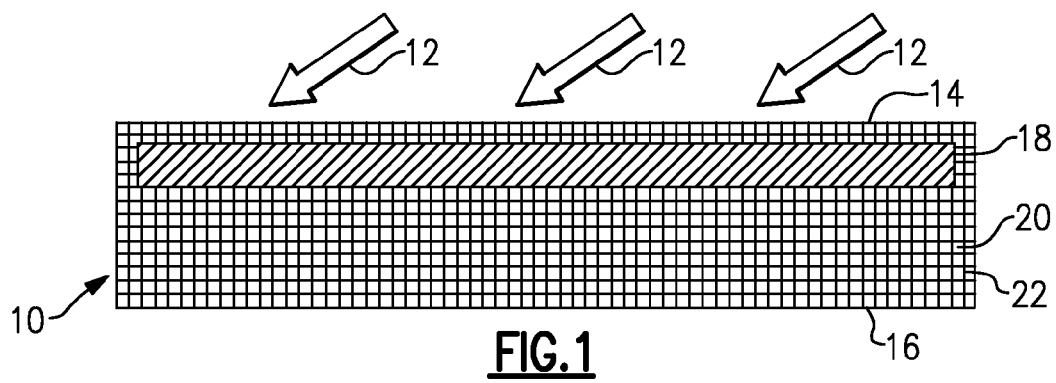
FIG. 1 illustrates a cross-sectional view of an example composite article.

FIG. 1 illustrates an example composite article 10 for resisting erosion. In this example, the composite article 10 is shown schematically; however, it is to be understood that the composite article 10 may be formed with other shapes than shown, such as in the shape of a gas turbine engine fan blade, compressor blade, compressor vane, exit guide vane, inlet guide vane, compressor splitter, engine case, engine fairing, aircraft propeller, aircraft rotor, airfoil leading edge, or other component that would be subject to erosion.

As illustrated, the example composite article 10 is subject to an erosion environment as represented by arrows 12. For example, the erosion environment 12 is an air or gas stream flowing over the composite article 10. The erosion environment 12 may include entrained particles that impact the composite article 10 to thereby erode the composite article 10 over a period of time. In this regard, the composite article 10 includes a multilayer structure to protect the composite article 10 from the erosion. For example, as will be described, the multilayer structure of the composite article 10 may be designed for a particular type of erosion environment 12, such as to provide a desired degree of erosion resistance as determined by an erosion rate or the like.

The composite article 10 includes a sacrificial layer 14, a body layer 16, and an erosion resistant layer 18 between the sacrificial layer 14 and the body layer 16. As can be appreciated from the figures, the body layer 16 in the examples is thicker than each of the sacrificial layer 14 and the erosion resistant layer 18. The sacrificial layer 14 is directly exposed to the erosion environment 12. The sacrificial layer 14 at least partially erodes over a period of time to expose portions of the erosion resistant layer 18. Thus, in the disclosed example, the sacrificial layer 14 is allowed to or may partially erode such that the erosion resistant layer 18 becomes exposed and provides a degree of erosion resistance. For example, the erosion resistant layer 18 is harder than the sacrificial layer 14 and/or the body layer 16 to provide erosion resistance.

Figure 2:
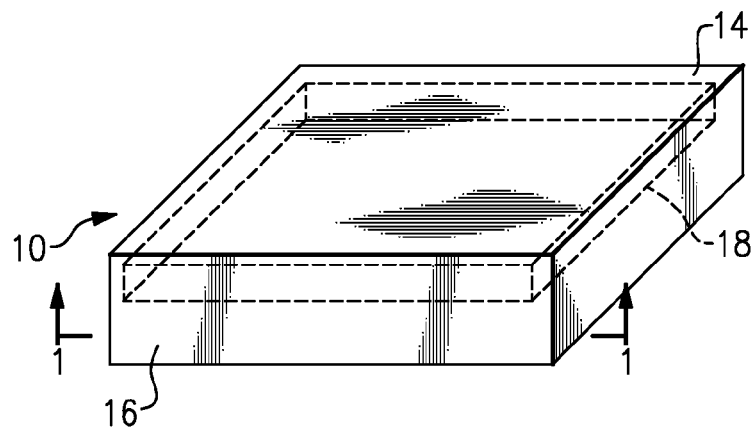
FIG. 2 illustrates a perspective view of the example composite article.

Referring to FIG. 2, the sacrificial layer 14 and the body layer 16 are connected and completely encase the erosion resistant layer 18. That is, prior to erosion of the sacrificial layer 14, the sacrificial layer 14 and the body layer 16 enclose all sides of the erosion resistant layer 18 such that no surfaces of the erosion resistant layer are exposed.

The sacrificial layer 14 and the body layer 16 may be formed from the same type of material. For example, the sacrificial layer 14 and the body layer 16 may be formed from any suitable type of material that would be desired for a particular application. In the disclosed example, the sacrificial layer 14 and the body layer 16 are formed from an organic matrix composite. The organic matrix composite includes a matrix material 20 and reinforcement fibers 22 (FIG. 1) distributed through the matrix material 20. The reinforcement fibers 22 may be discontinuous or continuous, depending upon the desired properties of the organic matrix composite, for example.

The matrix material 20 and the reinforcement fibers 22 may be selected from any suitable type of material that would be desired for the particular use. For example, the matrix material 20 may be a thermoset polymer or a thermoplastic polymer. In a further example, the matrix material 20 is polyimide, such as commonly available types of polyimides known as Skybond® (Monsanto Company Corporation, available through Industrial Summit Technology Co.), PETI (available through Ube America, Inc.), and AFR (available through Maverick Corporation). The reinforcement fibers 22 may include carbon graphite, silica glass, silicon carbide, or ceramic. Given this description, one of ordinary skill in the art will recognize that other types of matrix materials and reinforcement fibers may be used to suit the particular needs of an application.

Alternatively, the sacrificial layer 14 and the body layer 16 may be formed from a ceramic material. For example, the ceramic material may include a layer of tungsten carbide, boron nitride, titanium nitride, or silicon carbide. Given this description, one of ordinary skill in the art would recognize that other types of ceramic materials may be used.

The erosion resistant layer 18 may be formed from any type of material that is suitable for resisting erosion relative to the sacrificial layer 14 and the body layer 16. For example, the material of the erosion resistant layer 18 is harder than the material of the body layer 16 and the sacrificial layer 14. The erosion resistant layer 18 may also be any suitable thickness, such as 1-10 mils (0.0254-0.254 mm).

The erosion resistant layer 18 may be metal and include at least one of a nickel alloy, magnesium, lead, tin, zinc, antimony, titanium, steel, aluminum, chromium, molybdenum, tungsten, cobalt, or zinc. Alternatively, the erosion resistant layer 18 may include a ceramic material, such as tungsten carbide, boron nitride, titanium nitride, or silicon carbide. As can be appreciated, the material and thickness used for the erosion resistant layer 18 may be selected based upon a desired hardness and corresponding desired degree of erosion resistance.

Figure 3:
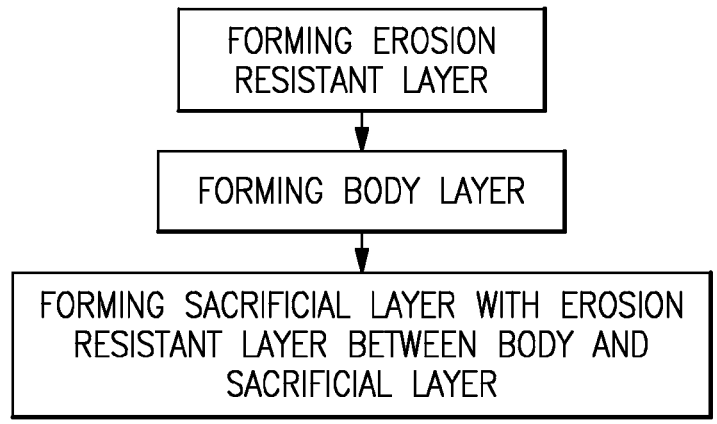
FIG. 3 illustrates an example method for processing a composite article.

Referring to FIG. 3, the example composite article 10 may be processed in any suitable manner, depending for example upon the types of materials selected for the sacrificial layer 14 and the body layer 16, and the erosion resistant layer 18. For example, the process includes forming the erosion resistant layer 18, forming the body layer 16, and forming the sacrificial layer 14 with the erosion resistant layer 18 between the body layer 16 and the sacrificial layer 14.

Figure 4:
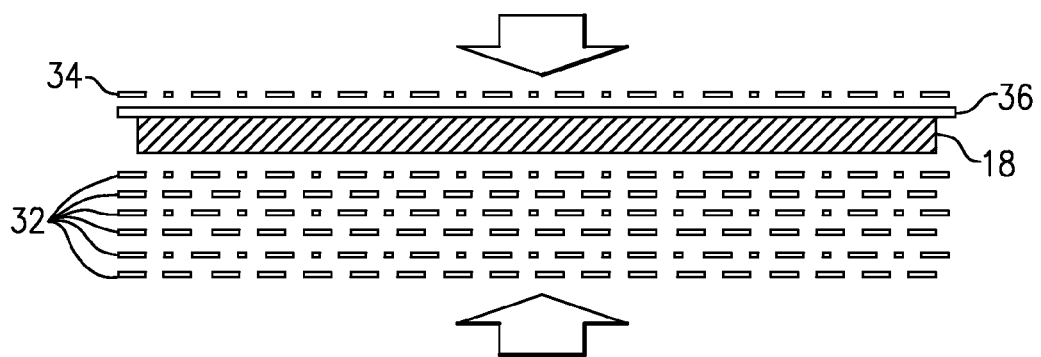
FIG. 4 illustrates an example method for forming a composite article from an organic matrix composite.

As can be appreciated, the methods of forming the various layers depend upon the types of materials selected for the layers. FIG. 4 illustrates one example process for forming the composite article 10, where the sacrificial layer 14 and the body layer 16 are an organic matrix composite. In this example, the body layer 16 and the sacrificial layer 14 are formed in a molding process by laying-up a desired number of pre-impregnated molding layers 32 in a desired orientation, which will later form the body layer 16. The term "laying-up" or derivations thereof are used in this description in reference to placing molding layers in a mold or other suitable tool.

The erosion resistant layer 18 is then located adjacent to the laid-up pre-impregnated molding layers 32. In this example, the erosion resistant layer 18 is pre-fabricated using a known process. For example, the erosion resistant layer 18 may be formed by depositing the material of the erosion resistant layer 18 onto a suitable shaped tool and then removing the formed layer. The deposition process may include, for example, chemical vapor deposition, ion vapor deposition, vapor deposition, plasma spray, or plating. Additional steps may be used to prepare the erosion resistant layer 18, such as cleaning, etching or other surface preparation to enhance bonding.

At least one pre-impregnated molding layer 34 for forming the sacrificial layer 14 is then located on the erosion resistant layer 18, such that the erosion resistant layer 18 is located between the pre-impregnated molding layers 32 and the pre-impregnated layer or layers 34. The pre-impregnated molding layers 32 and 34 may take any suitable form, such as layers of resin-impregnated fabric or tape.

Optionally, a layer of adhesive 36, such as polyimide, may be deposited between the pre-impregnated layer 34 and the erosion resistant layer 18 before laying-up the pre-impregnated layer 34 to facilitate adhesion between the sacrificial layer 14 and the erosion resistant layer 18.

After the lay-up process, the pre-impregnated molding layers 32 and 34 and the erosion resistant layer 18 are consolidated under heat and pressure to form the composite article 10. Alternatively, other types of molding processes may be used to form the sacrificial layer 14 and the body layer 16, such as transfer molding, autoclave molding, or other molding process. After consolidation, the composite article 10 additional secondary processes may be used to finish the composite article 10, such as deflashing, trimming, or the like.

Figure 5:
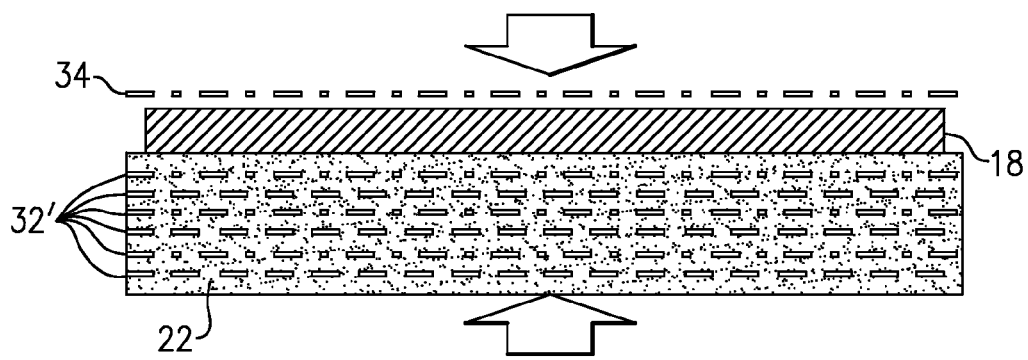
FIG. 5 illustrates another example method for forming a composite article from an organic matrix composite.

FIG. 5 illustrates another molding process that is somewhat similar to the molding process of FIG. 3, except that in this example, pre-impregnated molding layers 32' for forming the body layer 16 are partially cured before laying-up the erosion resistant layer 18 and the pre-impregnated molding layer 34 for forming the sacrificial layer 14. That is, the pre-impregnated molding layers 32' have been pre-consolidated under a suitable heat and pressure to partially cure the matrix material 20. Partially curing the matrix material 20 facilitates control over the dimensional size of the final composite article 10, release of volatile organic materials consolidation of the composite article 10, and longer shelf life of the pre-impregnated molding layers 32' prior to forming the composite article 10.

Figure 6:
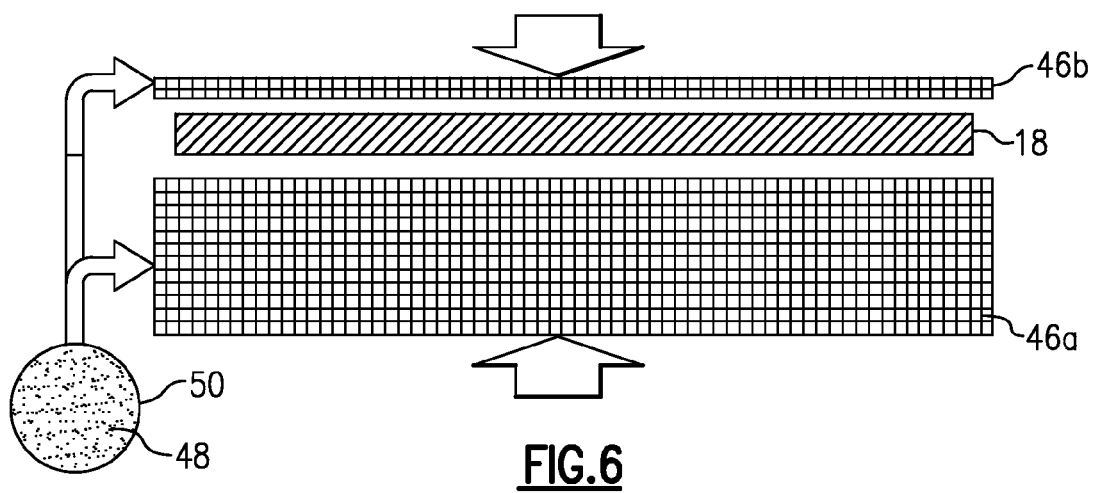
FIG. 6 illustrates an example method for forming a composite article from a ceramic material.

FIG. 6 illustrates another example for forming the composite article 10, where the sacrificial layer 14 and the body layer 16 are a ceramic material. In this example, ceramic processing steps are used to form the sacrificial layer 14 and the body layer 16.

For example, the sacrificial layer 14 and the body layer 16 may be formed from any suitable ceramic processing method for the selected type of ceramic material. In one example, the sacrificial layer 14 and the body layer 16 are formed using a slip-casting process to infiltrate porous supports 46a and 46b with a desired ceramic material. For example, the porous supports 46a and 46b are exposed to a suspension of ceramic particles 48 in a suitable carrier 50, such as water or other solvent, to infiltrate the porous supports 46a and 46b with the ceramic particles 48. The porous supports 46a and 46b may be subsequently dried and repeated through multiple cycles to deposit a desired amount of the ceramic particles 48. The porous supports 46a and 46b may then be subjected to a suitable temperature and pressure to consolidate and/or sinter the ceramic particles 48 and thereby form the sacrificial layer 14 and the body layer 16 of the composite article 10.

Alternatively, instead of using the ceramic particles 48 suspended in the carrier fluid 50, a preceramic polymer may be infiltrated into the porous supports 46a and 46b, or the preceramic polymer may be used in place of the porous supports 46a and 46b as a monolayer that forms the sacrificial layer 14 and the body layer 16. The preceramic polymer may then be subjected to a suitable temperature and pressure to transform the preceramic polymer into the ceramic material. As can be appreciated, the material of the erosion resistant layer 18 may be selected based on compatibility with the ceramic processing, such as to withstand elevated ceramic processing temperatures.

The disclosed examples thereby provide the composite article 10 with a desired degree of erosion resistance. Additionally, the erosion resistant layer 18 is relatively strongly bonded to the body layer 16 and the sacrificial layer 14 to thereby resist spalling. For example, since the erosion resistant layer 18 is incorporated directly into the process for forming the sacrificial layer 14 and the body layer 16, the matrix material 20 is able to wet the surface of the erosion resistant layer 18 and thereby provide relatively strong mechanical interlocking between the erosion resistant layer 18 and the body layer 16. Furthermore, the sacrificial layer 14 may also function to contain the erosion resistant layer 18 to prevent any spalled pieces of the erosion resistant layer 18 from being liberated into the erosion environment 12.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article for resisting erosion, comprising:
    a sacrificial layer for exposure to an erosion environment;
    a body layer, where the sacrificial layer is made of a first ceramic material and the body layer is made of a second ceramic material having the same ceramic material composition as the first ceramic material, wherein the first ceramic material and the second ceramic material are each a ceramic matrix composite; and
    an erosion resistant layer located between the sacrificial erosion layer and the body layer for protecting the body layer upon erosion of the sacrificial layer to expose the erosion layer to the erosion environment, and the body layer is thicker than each of the sacrificial layer and the erosion resistant layer.

2. The composite article as recited in claim 1, wherein the erosion resistant layer is a ceramic layer, and the ceramic layer comprises at least one of tungsten carbide, boron nitride, titanium nitride, or silicon carbide.

3. A composite article for resisting erosion, comprising:
    a sacrificial layer for exposure to an erosion environment;
    a body layer, where the sacrificial layer is made of a first ceramic material and the body layer is made of a second ceramic material having the same ceramic material composition as the first ceramic material, wherein the first ceramic material and the second ceramic material are selected from a group consisting of tungsten carbide, boron nitride, titanium nitride, silicon carbide, and combinations thereof; and
    an erosion resistant layer located between the sacrificial erosion layer and the body layer for protecting the body layer upon erosion of the sacrificial layer to expose the erosion layer to the erosion environment, and the body layer is thicker than each of the sacrificial layer and the erosion resistant layer.

4. A method of processing a composite article for resisting erosion, comprising:
    forming a body layer;
    forming a sacrificial layer with an erosion resistant layer between the sacrificial erosion layer and the body layer protecting the body layer upon erosion of the sacrificial layer to expose the erosion layer to an erosion environment, where the sacrificial layer and the body layer are formed of materials having the same material composition;
    selecting the material composition to be a ceramic material selected from a group consisting of tungsten carbide, boron nitride, titanium nitride, silicon carbide and combinations thereof; and
    forming the ceramic material from a preceramic polymer or by slip casting the ceramic material.

5. The method as recited in claim 4, further comprising forming the erosion resistant layer from a ceramic material comprising at least one of tungsten carbide, boron nitride, titanium nitride, or silicon carbide.

6. The method as recited in claim 4, further comprising depositing an adhesive between the sacrificial layer and the erosion resistant layer to bond the sacrificial layer and the erosion resistant layer together.

7. The method as recited in claim 4, further comprising partially curing the body layer prior to forming the sacrificial layer.

8. A method of processing a composite article for resisting erosion, comprising:
    laying-up at least one pre-impregnated molding layer for forming a body layer;
    laying-up a pre-fabricated erosion resistant layer adjacent to the pre-impregnated molding layer;
    laying-up a pre-impregnated molding layer for forming a sacrificial layer on the erosion resistant layer such that the erosion resistant layer is between the pre-impregnated molding layer for forming the body layer and the pre-impregnated molding layer for forming the sacrificial layer;
    curing the pre-impregnated molding layers to form the composite article;
    partially curing the at least one pre-impregnated molding layer for forming the body layer prior to laying-up and curing the pre-impregnated molding layer for forming the sacrificial layer.

9. The method as recited in claim 8, wherein the pre-fabricated erosion resistant layer is formed prior to laying-up the pre-fabricated erosion resistant layer adjacent to the pre-impregnated molding layer.

* * * * *